United States Patent
Tabata et al.

(10) Patent No.: US 6,277,327 B1
(45) Date of Patent: Aug. 21, 2001

(54) METHOD FOR THE ANTICORROSIVE TREATMENT OF WASTE PLASTICS TREATING EQUIPMENT

(75) Inventors: Masanori Tabata, Tokyo; Naohiko Ukawa, Hiroshima; Masato Kaneko, Hiroshima; Kazuto Kobayashi, Hiroshima; Shigeo Hasegawa, Hiroshima; Wataru Matsubara, Hiroshima; Kenji Iwasaki, Hiroshima; Yoshihisa Saito; Takehiko Moriya, both of Sendai, all of (JP)

(73) Assignees: Tohoku Electric Power Company, Inc., Sendai; Mitsubishi Heavy Industries, Ltd., Tokyo, both of (JP)

(*) Notice: Subject to any disclaimer, the term of this patent is extended or adjusted under 35 U.S.C. 154(b) by 0 days.

(21) Appl. No.: 09/239,607

(22) Filed: Jan. 29, 1999

(30) Foreign Application Priority Data

Jan. 29, 1998 (JP) .................................................. 10-016570

(51) Int. Cl.[7] .............................. C23F 11/08; C23C 22/05
(52) U.S. Cl. .............................. 422/7; 422/19; 106/14.05; 148/243; 148/276; 148/286; 148/287
(58) Field of Search ...................... 422/7, 19; 106/14.05; 148/240, 243, 264, 276, 287, 286

(56) References Cited

U.S. PATENT DOCUMENTS

| | | | |
|---|---|---|---|
| 5,104,463 | 4/1992 | Menke | 148/264 |
| 5,630,887 * | 5/1997 | Benum et al. | 148/280 |
| 5,741,372 * | 4/1998 | Gugel | 148/276 |
| 5,911,841 * | 6/1999 | Ohmi | 148/280 |

FOREIGN PATENT DOCUMENTS

| | | | |
|---|---|---|---|
| 4312417 A1 | 10/1994 | (DE) | C23F/11/06 |
| 4329461 A1 | 3/1995 | (DE) | C08J/11/20 |
| 61012878 | 1/1986 | (JP) | C23C/22/64 |
| WO 94/24333 | 10/1994 | (WO) | C23C/22/62 |

OTHER PUBLICATIONS

Austrian Patent Office Search Report, Date of Mailing: Feb. 29, 2000 for Singapore Patent Application No. 9900216-4.
European Search Report dated Jun. 8, 1999 for European Patent Application No. 99101085.1-2307.

* cited by examiner

Primary Examiner—Elizabeth McKane
(74) Attorney, Agent, or Firm—Myers Bigel Sibley & Sajovec, P.A.

(57) ABSTRACT

This invention relates to equipment for treating the aforesaid waste plastics directly with supercritical water, and an object thereof is to provide a method for the anticorrosive treatment of waste plastics treating equipment which makes it possible to use inexpensive stainless steel. Waste plastics treating equipment made of stainless steel is charged with a predetermined amount of an aqueous solution containing at least one alkali metal salt, and this aqueous solution is deaerated until its dissolved oxygen content is reduced to 0.5 mg/L or less. After the temperature and pressure of the equipment are raised until supercritical conditions are established, these temperature and pressure are maintained for a predetermined period of time.

4 Claims, 1 Drawing Sheet

METHOD FOR THE ANTICORROSIVE TREATMENT OF WASTE PLASTICS TREATING EQUIPMENT

BACKGROUND OF THE INVENTION

This invention relates to a method for the anticorrosive treatment of waste plastics treating equipment in which waste plastics are treated by supercritical water.

It is conventionally known that natural and synthetic polymeric compounds can be decomposed by means of supercritical or subcritical water.

Meanwhile, in equipment for the treatment of chlorine-containing waste plastics such as vinyl chloride resin and polychlorotrifluoroethylene, chlorine is released from such resins, and the equipment material (e.g., stainless steel) is heavily corroded by the chlorine. Although the degree of corrosion may vary according to the chemical composition of the equipment material and the Cl concentration in the aqueous solution, the treatment especially with supercritical water is carried out under high-temperature and high-pressure conditions. Consequently, when stainless steel is used as the equipment material, it is highly susceptible to pitting, crevice corrosion, stress corrosion cracking and other corrosion due to chlorine ion. As a countermeasure against it, nickel alloys having special chemical compositions have been used.

However, such nickel alloys are so expensive that the construction cost of the equipment is raised to an undue extent. Accordingly, in the case of equipment for the treatment of chlorine-containing waste plastics such as vinyl chloride resin and polychlorotrifluoroethylene, there has been developed a process which avoids the direct treatment of such resins with supercritical water. Specifically, according to this waste plastics treating process, such resins are first dechlorinated by pyrolysis at 300–350° C. in a separate dechlorination apparatus, and the remaining dechlorinated resins are then treated with supercritical water.

As a result of dechlorination, this process permits relatively inexpensive stainless steel to be used as the equipment material. However, this process is more complicated and requires a greater number of system components, as compared with the process for treating waste plastics directly. As a result, this process still involves the problem that the construction cost of the system is very high.

SUMMARY OF THE INVENTION

In view of the above-described existing state of the art, the present invention relates to equipment for treating the aforesaid waste plastics directly with supercritical water, and an object thereof is to provide a method for the anticorrosive treatment of waste plastics treating equipment which makes it possible to use inexpensive stainless steel.

According to the present invention, there is provided a method for the anticorrosive treatment of waste plastics treating equipment which comprises the steps of providing waste plastics treating equipment made of stainless steel, charging the equipment with a predetermined amount of an aqueous solution containing at least one alkali metal salt, deaerating the aqueous solution, raising the temperature and pressure of the equipment until supercritical conditions are established, and maintaining the temperature and pressure for a predetermined period of time.

According to the anticorrosive treatment method of the present invention, a dense black film having a thickness of several micrometers is formed on the surface of the stainless steel. This film has excellent corrosion resistance, scratch resistance and abrasion resistance, and is never corroded under supercritical water conditions including a saturated aqueous solution of NaCl. The black film formed in the present invention is an oxide film composed of $Fe_3O_4$ and $FeCr_2O_4$, and its composition is equal to that of a film formed by conventional passivation treatment which will be described later. However, as contrasted with the conventional passivation treatment film which has a thickness of several tens of nanometers, the black film formed in the present invention has a very large thickness of several micrometers and is much more excellent in corrosion resistance, scratch resistance and abrasion resistance. This film can be thickened by extending the anticorrosive treatment time.

As is evident from the above description, the present invention relates to equipment for treating the aforesaid waste plastics directly with supercritical water, and provides a method for the anticorrosive treatment of waste plastics treating equipment which makes it possible to use inexpensive stainless steel.

DETAILED DESCRIPTION OF THE PREFERRED EMBODIMENT

Figure 1:
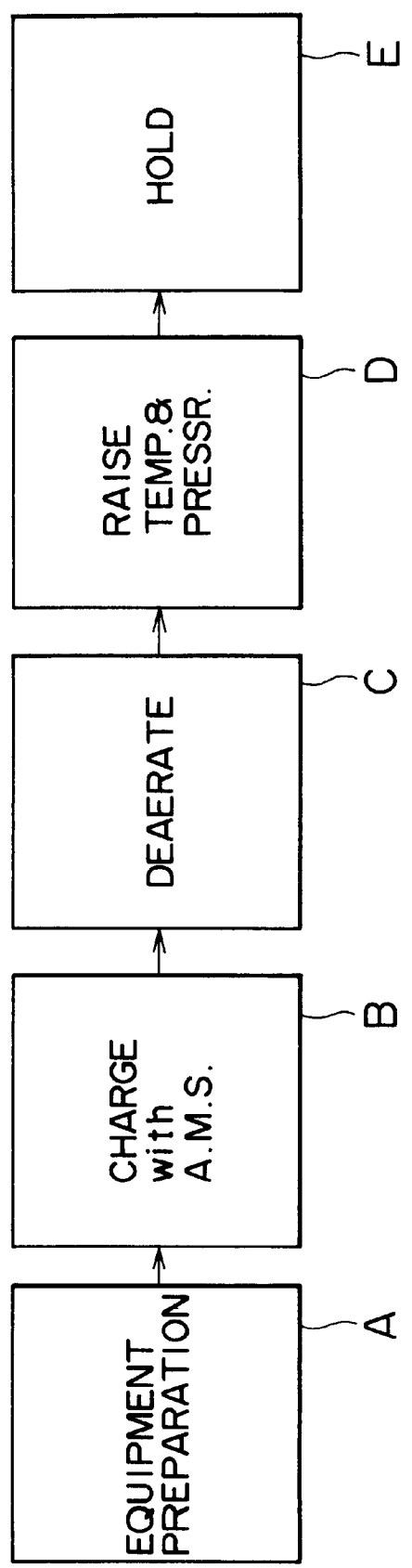
FIG. 1 is a block diagram showing an outline of the anticorrosive treatment method of the present invention.

FIG. 1 shows various steps included in the method for the anticorrosive treatment of waste plastics treating equipment in accordance with the present invention.

The present invention relates to the anticorrosive treatment of waste plastics treating equipment made of stainless steel. Accordingly, equipment for treating waste plastics with supercritical water should be made by using stainless steel (step A in FIG. 1).

It is generally known that stainless steel is passivated by soaking it in nitric acid, a mixture of nitric acid and hydrofluoric acid, or the like at atmospheric pressure to form an oxide film having a thickness of several tens of nanometers on the surface thereof, resulting in improved corrosion resistance. However, the film formed by this passivation treatment is so thin that, during manufacture of the equipment, it is frequently lost by damage caused during construction, impingement of solid matter contained in the process fluid, or erosion by a liquid having a high flow velocity. In the existing circumstances, therefore, this technique cannot be applied to the parts where a nickel alloy must be used. The present invention overcomes this technical commonsense and provides an epoch-making passivation treatment method.

Moreover, the present invention also relates to the equipment used in a process for treating waste plastics with supercritical water. As used herein, the term "supercritical water" means water in its supercritical state which is obtained by controlling the temperature and pressure properly in the range of 200 to 800° C. and 20.0 to 918 $kgf/cm^2$, respectively. Preferably, such supercritical water is obtained by controlling the temperature and pressure properly in the range of 250 to 450° C. and 51 to 510 $kgf/cm^2$, respectively. The term "supercritical water" also comprehends subcritical water, so far as the application of the present invention is not interfered with.

According to the present invention, the aforesaid equipment is first charged with an aqueous solution containing at least one alkali metal salt (step B in FIG. 1).

The alkali metal salt used for this purpose is selected from the sulfates, sulfites, carbonates, hydrogencarbonates, nitrates and chlorides of Na and K. These compounds may be used alone or in admixture. Its concentration may range from 100 mg/L to its solubility limit. However, its concentration is preferably in the range of 1,000 to 10,000 mg/L.

According to the present invention, the aqueous solution is then deaerated (e.g., by replacement with $N_2$) until its dissolved oxygen content is reduced to 0.5 mg/L or less (step C in FIG. 1). If its dissolved oxygen content is greater than 0.5 mg/L, the passivation film desired in the present invention, which is composed of $Fe_3O_4$ and $FeCr_2O_4$ and has excellent corrosion resistance, will not be formed. Instead, a soft and porous film composed chiefly of $Fe_2O_3$ is attached to the surface of the stainless steel, so that no anticorrosive effect is not obtained.

According to the present invention, the temperature and pressure of the equipment are raised until supercritical conditions are established (step D in FIG. 1). Even if the treating temperature and pressure are lower than supercritical conditions (e.g., 300° C. and 100 kg/cm$^2$), a passivation film will be formed. However, its thickness is very small, and a very long time will be required to achieve a film thickness equal to that of the film desired in the present invention. This is impractical from an economic point of view.

Thereafter, the equipment is held under the supercritical conditions for a predetermined period of time (step E in FIG. 1). This holding time is usually not less than 10 hours and preferably in the range of 50 to 100 hours.

EXAMPLES

The present invention will be explained in more detail by way of examples, which are not intended to be limiting of the present invention.

Formation of a Film

A plurality of 10 mm×50 mm×2 mm specimens made of the stainless steel shown in Table 1 were placed in an autoclave having an internal volume of 500 mL. Then, the autoclave was charged with 100 ml of an aqueous solution having the composition shown in Table 1, and deaerated according to the procedure of FIG. 1 until the dissolved oxygen content of the solution was reduced to 0.5 mg/L or less. Thereafter, the autoclave was immersed in a tin bath placed in an electric furnace for external heating use, adjusted to supercritical conditions including 500° C. and 250 kg/cm$^2$, and held under these conditions for the time shown in Table 1. Thereafter, the specimens were taken out, and the thickness of a black dense film formed on the surface of each specimen made of the stainless steel shown in Table 1 was measured by the electron microscopic examination of a section of the specimen. Moreover, the compounds constituting the film were identified by X-ray fluorometry and X-ray diffractometry.

Corrosion Test

Subsequently, the specimens treated in the above-described manner and 80 mL of a saturated aqueous solution of NaCl were placed in an autoclave having an internal volume of 500 mL. After the oxygen in the gas phase was replaced with $N_2$ gas, the dissolved oxygen content of the solution was reduced to 0.5 mg/L or less. Then, a corrosion test was carried out under supercritical conditions including 500° C. and 250 kg/cm$^2$ for 3 months. The results thus obtained are shown in Table 1.

Results and Discussion

In Example Nos. 1 to 28 which satisfied the treating conditions described above for the various steps of the method of the present invention, the corrosion wear was not greater than 0.01 mm/y for all materials, and no abnormalities such as pitting and cracking were not observed.

However, in Example No. 29 in which supercritical water was not used and Example No. 30 in which no alkali metal salt was added, pitting was observed.

Moreover, in Example Nos. 31 to 39 in which the dissolved oxygen content was adjusted to a level of 1.0 to 1.5 mg/L (i.e., greater than 0.5 mg/L), the corrosion wear was greater than 0.5 mm/y and pitting was observed.

TABLE 1

| No. | Material of specimen | Amount of alkali metal salt added (mg/L) | | | | | | Temp. (° C.) | Pressure (kg/cm$^2$) | Holding time (h) | Film thickness ($\mu$m) | Film compounds | Results of corrosion test |
|---|---|---|---|---|---|---|---|---|---|---|---|---|---|
| | | Na$_2$SO$_4$ | Na$_2$SO$_3$ | Na$_2$CO$_3$ | NaHCO$_3$ | NaNO$_3$ | NaCl | | | | | | |
| | | | | | (No.1–No. 10) | | | | | | | | |
| 1 | SUS316 | 100,000 | 0 | 0 | 0 | 0 | 0 | 500 | 250 | 100 | 3 | Fe$_3$O$_4$ FeCr$_2$O$_4$ | Corrosion wear: <0.01 mm/y Cracking or other abnormality : None |
| 2 | SUS316 | 10,000 | 0 | 0 | 0 | 0 | 0 | 500 | 250 | 100 | 3 | Fe$_3$O$_4$ FeCr$_2$O$_4$ | Corrosion wear: <0.01 mm/y Cracking or other abnormality : None |
| 3 | SUS316 | 1,000 | 0 | 0 | 0 | 0 | 0 | 500 | 250 | 100 | 2.5 | Fe$_3$O$_4$ FeCr$_2$O$_4$ | Corrosion wear: <0.01 mm/y Cracking or other abnormality : None |
| 4 | SUS316 | 100 | 0 | 0 | 0 | 0 | 0 | 500 | 250 | 100 | 2 | Fe$_3$O$_4$ FeCr$_2$O$_4$ | Corrosion wear: <0.01 mm/y Cracking or other abnormality : None |
| 5 | SUS316 | 1,000 | 0 | 0 | 0 | 0 | 0 | 500 | 250 | 300 | 3.5 | Fe$_3$O$_4$ | Corrosion wear: |

TABLE 1-continued

| No. | Material of specimen | Amount of alkali metal salt added (mg/L) | | | | | | Temp. (° C.) | Pressure (kg/cm$^2$) | Holding time (h) | Film thickness ($\mu$m) | Film compounds | Results of corrosion test |
|---|---|---|---|---|---|---|---|---|---|---|---|---|---|
| | | Na$_2$SO$_4$ | Na$_2$SO$_3$ | Na$_2$CO$_3$ | NaHCO$_3$ | NaNO$_3$ | NaCl | | | | | | |
| 6 | SUS316 | 0 | 100,000 | 0 | 0 | 0 | 0 | 500 | 250 | 100 | 3 | Fe$_3$O$_4$ FeCr$_2$O$_4$ | Corrosion wear: <0.01 mm/y Cracking or other abnormality: None |
| 7 | SUS316 | 0 | 100 | 0 | 0 | 0 | 0 | 500 | 250 | 100 | 2 | Fe$_3$O$_4$ FeCr$_2$O$_4$ | Corrosion wear: <0.01 mm/y Cracking or other abnormality: None |
| 8 | SUS316 | 0 | 0 | 100,000 | 0 | 0 | 0 | 500 | 250 | 100 | 3 | Fe$_3$O$_4$ FeCr$_2$O$_4$ | Corrosion wear: <0.01 mm/y Cracking or other abnormality: None |
| 9 | SUS316 | 0 | 0 | 100 | 0 | 0 | 0 | 500 | 250 | 100 | 2 | Fe$_3$O$_4$ FeCr$_2$O$_4$ | Corrosion wear: <0.01 mm/y Cracking or other abnormality: None |
| 10 | SUS316 | 0 | 0 | 0 | 100,000 | 0 | 0 | 500 | 250 | 100 | 3 | Fe$_3$O$_4$ FeCr$_2$O$_4$ | Corrosion wear: <0.01 mm/y Cracking or other abnormality: None |
| | | | | (No. 11–No. 20) | | | | | | | | | |
| 11 | SUS316 | 0 | 0 | 0 | 100 | 0 | 0 | 500 | 250 | 100 | 2 | Fe$_3$O$_4$ FeCr$_2$O$_4$ | Corrosion wear: <0.01 mm/y Cracking or other abnormality: None |
| 12 | SUS316 | 0 | 0 | 0 | 0 | 100,000 | 0 | 500 | 250 | 100 | 3 | Fe$_3$O$_4$ FeCr$_2$O$_4$ | Corrosion wear: <0.01 mm/y Cracking or other abnormality: None |
| 13 | SUS316 | 0 | 0 | 0 | 0 | 100 | 0 | 500 | 250 | 100 | 2 | Fe$_3$O$_4$ FeCr$_2$O$_4$ | Corrosion wear: <0.01 mm/y Cracking or other abnormality: None |
| 14 | SUS316 | 0 | 0 | 0 | 0 | 0 | 100,000 | 500 | 250 | 100 | 3 | Fe$_3$O$_4$ FeCr$_2$O$_4$ | Corrosion wear: <0.01 mm/y Cracking or other abnormality: None |
| 15 | SUS316 | 0 | 0 | 0 | 0 | 0 | 100 | 500 | 250 | 100 | 2 | Fe$_3$O$_4$ FeCr$_2$O$_4$ | Corrosion wear: <0.01 mm/y Cracking or other abnormality: None |
| 16 | SUS317 | 1,000 | 0 | 0 | 0 | 0 | 0 | 500 | 250 | 100 | 3 | Fe$_3$O$_4$ FeCr$_2$O$_4$ | Corrosion wear: <0.01 mm/y Cracking or other abnormality: None |
| 17 | SUS317 | 0 | 1,000 | 0 | 0 | 0 | 0 | 500 | 250 | 100 | 3 | Fe$_3$O$_4$ FeCr$_2$O$_4$ | Corrosion wear: <0.01 mm/y Cracking or other abnormality: None |
| 18 | SUS317 | 0 | 0 | 1,000 | 0 | 0 | 0 | 500 | 250 | 100 | 3 | Fe$_3$O$_4$ FeCr$_2$O$_4$ | Corrosion wear: <0.01 mm/y Cracking or other abnormality: None |
| 19 | SUS317 | 0 | 0 | 0 | 1,000 | 0 | 0 | 500 | 250 | 100 | 3 | Fe$_3$O$_4$ FeCr$_2$O$_4$ | Corrosion wear: <0.01 mm/y |

TABLE 1-continued

| No. | Material of specimen | Amount of alkali metal salt added (mg/L) | | | | | | Temp. (°C.) | Pressure (kg/cm$^2$) | Holding time (h) | Film thickness ($\mu$m) | Film compounds | Results of corrosion test |
|---|---|---|---|---|---|---|---|---|---|---|---|---|---|
| | | Na$_2$SO$_4$ | Na$_2$SO$_3$ | Na$_2$CO$_3$ | NaHCO$_3$ | NaNO$_3$ | NaCl | | | | | | |
| 20 | SUS317 | 0 | 0 | 0 | 0 | 1,000 | 0 | 500 | 250 | 100 | 3 | Fe$_3$O$_4$ FeCr$_2$O$_4$ | Cracking or other abnormality: None Corrosion wear: <0.01 mm/y |
| (No. 21–No. 30) | | | | | | | | | | | | | |
| 21 | SUS317 | 0 | 0 | 0 | 0 | 0 | 1,000 | 500 | 250 | 100 | 3 | Fe$_3$O$_4$ FeCr$_2$O$_4$ | Cracking or other abnormality: None Corrosion wear: <0.01 mm/y |
| 22 | SUS316 | 1,000 | 1,000 | 1,000 | 1,000 | 1,000 | 1,000 | 500 | 250 | 100 | 3 | Fe$_3$O$_4$ FeCr$_2$O$_4$ | Cracking or other abnormality: None Corrosion wear: <0.01 mm/y |
| 23 | SUS316 | 1,000 | 1,000 | 1,000 | 1,000 | 1,000 | 0 | 500 | 250 | 100 | 3 | Fe$_3$O$_4$ FeCr$_2$O$_4$ | Cracking or other abnormality: None Corrosion wear: <0.01 mm/y |
| 24 | SUS316 | 1,000 | 1,000 | 1,000 | 1,000 | 0 | 0 | 500 | 250 | 100 | 3 | Fe$_3$O$_4$ FeCr$_2$O$_4$ | Cracking or other abnormality: None Corrosion wear: <0.01 mm/y |
| 25 | SUS316 | 1,000 | 1,000 | 1,000 | 0 | 0 | 0 | 500 | 250 | 100 | 3 | Fe$_3$O$_4$ FeCr$_2$O$_4$ | Cracking or other abnormality: None Corrosion wear: <0.01 mm/y |
| 26 | SUS316 | 1,000 | 1,000 | 0 | 0 | 0 | 0 | 500 | 250 | 100 | 3 | Fe$_3$O$_4$ FeCr$_2$O$_4$ | Cracking or other abnormality: None Corrosion wear: <0.01 mm/y |
| 27 | SUS316 | 0 | 1,000 | 1,000 | 1,000 | 1,000 | 1,000 | 500 | 250 | 100 | 3 | Fe$_3$O$_4$ FeCr$_2$O$_4$ | Cracking or other abnormality: None Corrosion wear: <0.01 mm/y |
| 28 | SUS316 | 0 | 1,000 | 1,000 | 1,000 | 1,000 | 0 | 500 | 250 | 100 | 3 | Fe$_3$O$_4$ FeCr$_2$O$_4$ | Cracking or other abnormality: None Corrosion wear: <0.01 mm/y |
| 29 | SUS316 | 1,000 | 0 | 0 | 0 | 0 | 0 | 300 | 100 | 300 | <0.5 | Un-identified | Pitting |
| 30 | SUS316 | 0 | 0 | 0 | 0 | 0 | 0 | 500 | 250 | 300 | <0.0 | Un-identified | Pitting |
| (No. 31–No. 39) | | | | | | | | | | | | | |
| 31 | SUS317 | 1,000 | 0 | 0 | 0 | 0 | 0 | 500 | 250 | 100 | 2 | Fe$_2$O$_3$ Fe$_3$O$_4$ | Corrosion wear: <0.5 mm/y Cracking or other abnormality: Pitting |
| 32 | SUS317 | 0 | 1,000 | 0 | 0 | 0 | 0 | 500 | 250 | 100 | 3 | Fe$_2$O$_3$ Fe$_3$O$_4$ | Corrosion wear: <0.5 mm/y Cracking or other abnormality: Pitting |
| 33 | SUS317 | 0 | 0 | 1,000 | 0 | 0 | 0 | 500 | 250 | 100 | 2 | Fe$_2$O$_3$ Fe$_3$O$_4$ | Corrosion wear: <0.5 mm/y Cracking or other abnormality: Pitting |
| 34 | SUS317 | 0 | 0 | 0 | 1,000 | 0 | 0 | 500 | 250 | 100 | 3 | Fe$_2$O$_3$ Fe$_3$O$_4$ | Corrosion wear: <0.5 mm/y |

TABLE 1-continued

| No. | Material of specimen | Amount of alkali metal salt added (mg/L) | | | | | | Temp. (°C.) | Pressure (kg/cm$^2$) | Holding time (h) | Film thickness (μm) | Film compounds | Results of corrosion test |
|---|---|---|---|---|---|---|---|---|---|---|---|---|---|
| | | Na$_2$SO$_4$ | Na$_2$SO$_3$ | Na$_2$CO$_3$ | NaHCO$_3$ | NaNO$_3$ | NaCl | | | | | | |
| 35 | SUS317 | 0 | 0 | 0 | 0 | 1,000 | 0 | 500 | 250 | 100 | 4 | Fe$_2$O$_3$ Fe$_3$O$_4$ | Cracking or other abnormality: Pitting Corrosion wear: <0.5 mm/y |
| 36 | SUS317 | 0 | 0 | 0 | 0 | 0 | 1,000 | 500 | 250 | 100 | 3 | Fe$_2$O$_3$ Fe$_3$O$_4$ | Cracking or other abnormality: Pitting Corrosion wear: <0.5 mm/y |
| 37 | SUS316 | 1,000 | 0 | 0 | 0 | 0 | 0 | 500 | 250 | 100 | 2 | Fe$_2$O$_3$ Fe$_3$O$_4$ | Cracking or other abnormality: Pitting Corrosion wear: <0.5 mm/y |
| 38 | SUS316 | 0 | 1,000 | 0 | 0 | 0 | 0 | 500 | 250 | 100 | 2 | Fe$_2$O$_3$ Fe$_3$O$_4$ | Cracking or other abnormality: Pitting Corrosion wear: <0.5 mm/y |
| 39 | SUS316 | 0 | 0 | 1,000 | 0 | 0 | 0 | 500 | 250 | 100 | 3 | Fe$_2$O$_3$ Fe$_3$O$_4$ | Cracking or other abnormality: Pitting Corrosion wear: <0.5 mm/y |

It can be seen from these results that, when stainless steel is treated according to the anticorrosive treatment method of the present invention, a dense black film having a thickness of several micrometers is formed on the surface of the stainless steel. This film has excellent corrosion resistance, scratch resistance and abrasion resistance, and is never corroded under supercritical water conditions including a saturated aqueous solution of NaCl, as demonstrated by the foregoing examples. The black film formed in the present invention is an oxide film composed of Fe$_3$O$_4$ and FeCr$_2$O$_4$ as shown in Table 1, and its composition is equal to that of a film formed by the above-described conventional passivation treatment. However, as contrasted with the conventional passivation treatment film which has a thickness of several tens of nanometers, the black film formed in the present invention has a very large thickness of several micrometers and is much more excellent in corrosion resistance, scratch resistance and abrasion resistance.

It can also be seen that, if the dissolved oxygen content is greater than 0.5 mg/L, the passivation film desired in the present invention, which is composed of Fe$_3$O$_4$ and FeCr$_2$O$_4$ and has excellent corrosion resistance, is not formed. Instead, a soft and porous film composed chiefly of Fe$_2$O$_3$ is attached to the surface of the stainless steel, so that no anticorrosive effect is not obtained.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The disclosure of Japanese Patent Application No.10-16570 filed on Jan. 29, 1998 including specification, claims, drawings and summary are incorporated herein by reference in its entirety.

What is claimed is:

1. A method for the anticorrosive treatment of waste plastics treating equipment which comprises the steps of providing waste plastics treating equipment made of stainless steel, charging said equipment with a predetermined amount of an aqueous solution containing at least one alkali metal salt, deaerating the aqueous solution, raising the temperature and pressure of said equipment until supercritical conditions are established, and maintaining the temperature and pressure for a predetermined period of time.

2. A method for the anticorrosive treatment of waste plastics treating equipment as claimed in claim 1 wherein the aqueous solution is deaerated until its dissolved oxygen content is reduced to 0.5 mg/L or less.

3. A method for the anticorrosive treatment of waste plastics treating equipment as claimed in claim 2 wherein the alkali metal salt comprises at least one compound selected from the group consisting of the sulfates, sulfites, carbonates, hydrogencarbonates, nitrates and chlorides of Na and K.

4. A method for the anticorrosive treatment of waste plastics treating equipment as claimed in claim 1 wherein the alkali metal salt comprises at least one compound selected from the group consisting of the sulfates, sulfites, carbonates, hydrogencarbonates, nitrates and chlorides of Na and K.

* * * * *